(12) United States Patent
Miyazawa

(10) Patent No.: US 10,089,745 B2
(45) Date of Patent: Oct. 2, 2018

(54) IMAGE PROCESSING APPARATUS THAT ENABLES EASY TRACKING OF A SUBJECT IF THE SUBJECT MOVES TO OUTSIDE A FIELD ANGLE AND CONTROL METHOD FOR SAME

(71) Applicant: CANON KABUSHIKI KAISHA, Tokyo (JP)

(72) Inventor: Hitoshi Miyazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 14/825,388

(22) Filed: Aug. 13, 2015

(65) Prior Publication Data

US 2016/0057349 A1 Feb. 25, 2016

(30) Foreign Application Priority Data

Aug. 20, 2014 (JP) ................................. 2014-167644

(51) Int. Cl.
*G06T 7/20* (2017.01)
*H04N 5/232* (2006.01)

(52) U.S. Cl.
CPC ........... *G06T 7/20* (2013.01); *H04N 5/23254* (2013.01); *H04N 5/23258* (2013.01); *H04N 5/23296* (2013.01)

(58) Field of Classification Search
CPC ........... H04N 5/23248; H04N 5/23296; H04N 5/378; H04N 5/23254; H04N 5/23258; H04N 5/23293; G06T 7/20
See application file for complete search history.

(56) References Cited

U.S. PATENT DOCUMENTS

| | | | | |
|---|---|---|---|---|
| 5,867,213 A * | 2/1999 | Ouchi | ............... | H04N 5/23248 |
| | | | | 348/208.2 |
| 5,990,942 A * | 11/1999 | Ogino | ....................... | G06T 3/40 |
| | | | | 348/169 |
| 2005/0052533 A1* | 3/2005 | Ito | ........................ | G01S 3/7865 |
| | | | | 348/169 |
| 2005/0128309 A1* | 6/2005 | Tomita | .............. | H04N 5/23248 |
| | | | | 348/208.7 |
| 2009/0268079 A1* | 10/2009 | Motomura | ......... | H04N 5/23212 |
| | | | | 348/347 |
| 2013/0027510 A1* | 1/2013 | Tsubusaki | .......... | H04N 5/23212 |
| | | | | 348/36 |

FOREIGN PATENT DOCUMENTS

JP H07-226873 A 8/1995
JP 2010-093362 A 4/2010

OTHER PUBLICATIONS

The above reference was cited in an Apr. 17, 2018 Japanese Patent Office Action, which is enclosed, with translation, that issued in Japanese Patent Application No. 2014-167644.

* cited by examiner

*Primary Examiner* — Luong T Nguyen
(74) *Attorney, Agent, or Firm* — Cowan, Liebowitz & Latman, P.C.

(57) ABSTRACT

An image processing apparatus comprises a controller configured to select either of a first tracking system that tracks a subject by the optical processing of an optical image shake correction unit, or a second tracking system that tracks the subject by electronic processing of cutting out an area of the subject from an imaged image, as a tracking system used for tracking the subject in the captured image.

11 Claims, 7 Drawing Sheets

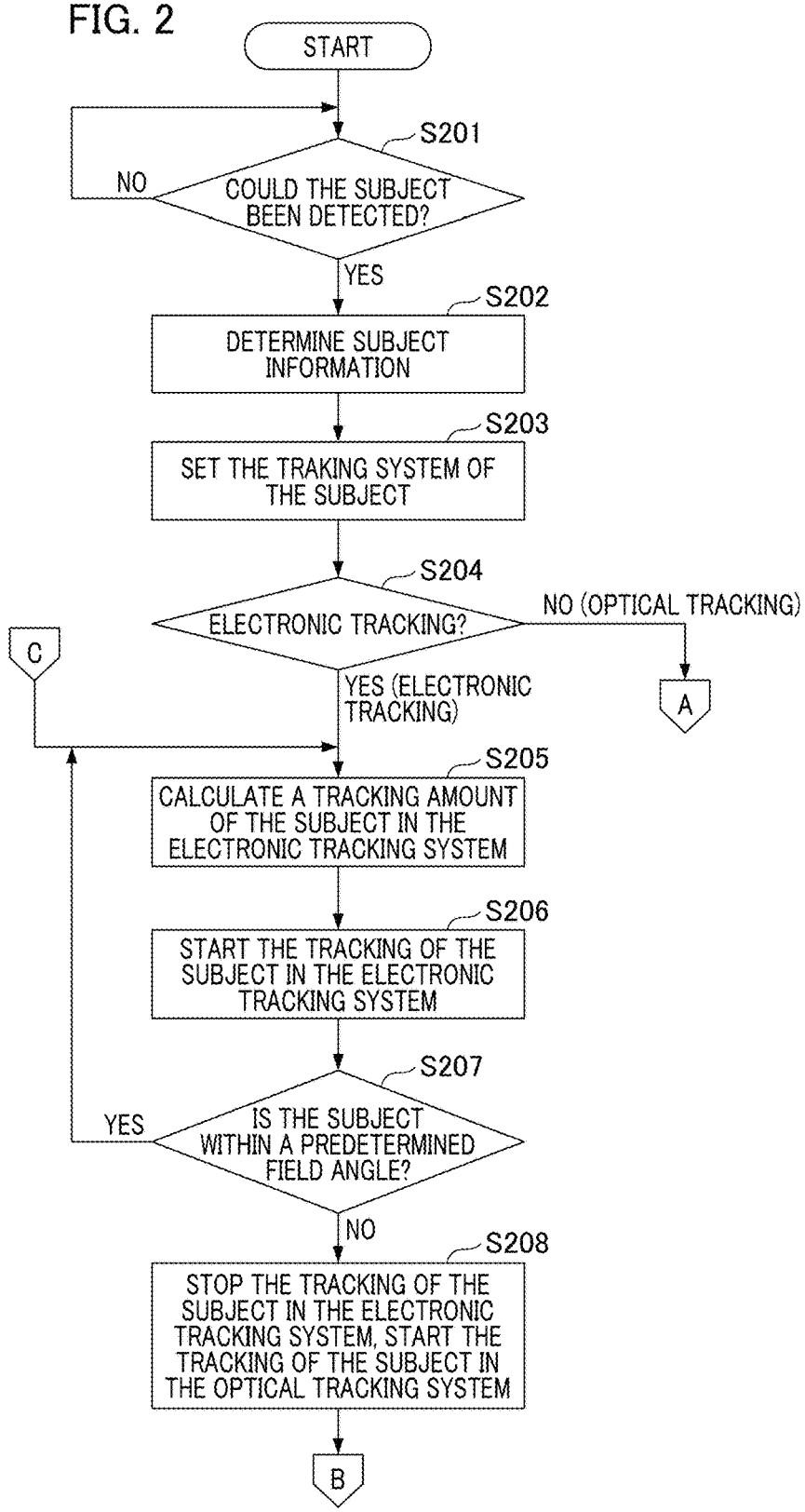

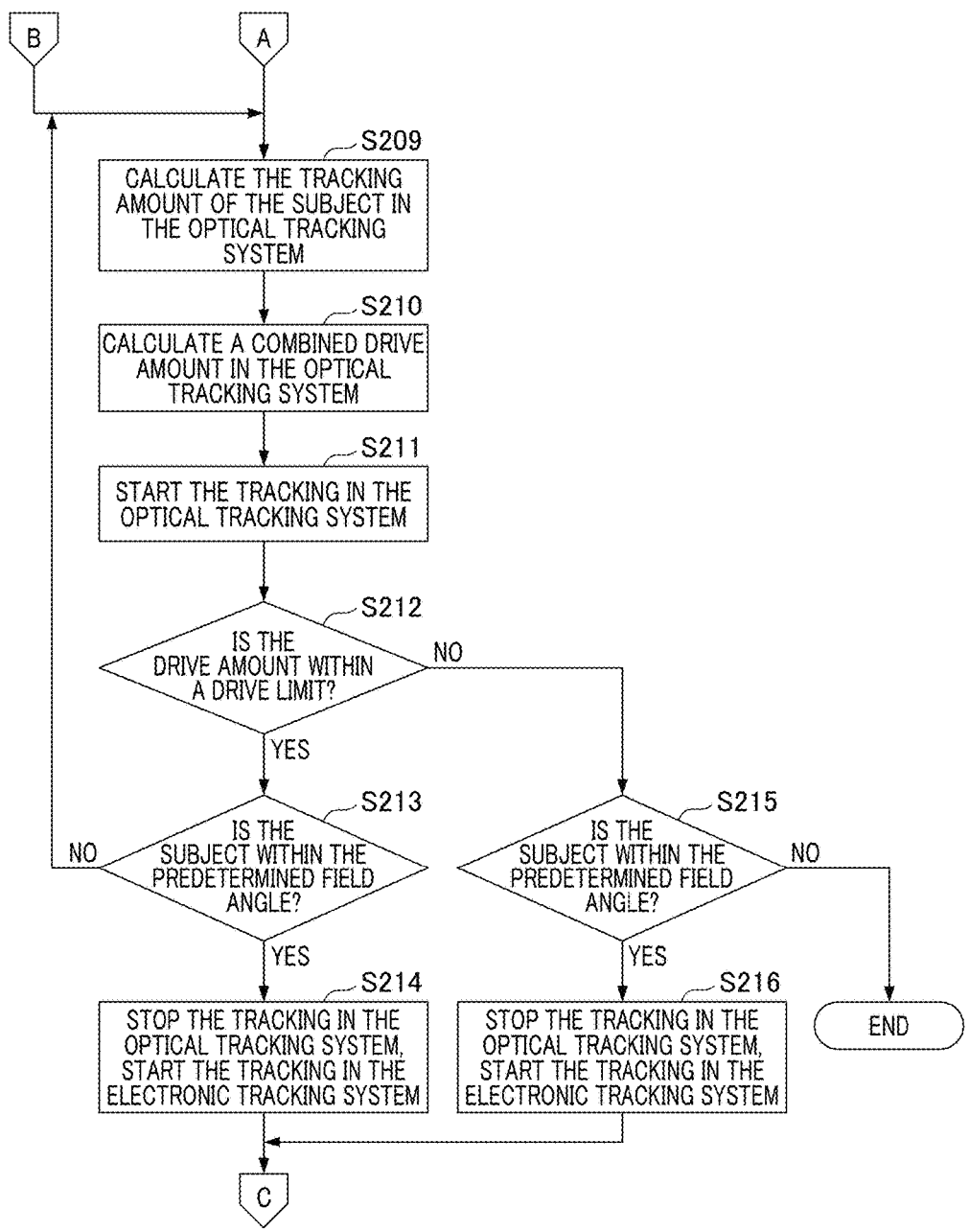

IMAGE PROCESSING APPARATUS THAT ENABLES EASY TRACKING OF A SUBJECT IF THE SUBJECT MOVES TO OUTSIDE A FIELD ANGLE AND CONTROL METHOD FOR SAME

BACKGROUND OF THE INVENTION

Field of the Invention

The present invention relates to an image processing apparatus and a control method for the same.

Description of the Related Art

With higher magnifications of image pickup apparatuses, for example, when zooming by using a 60× optical zoom lens, there have been cases where a subject moves outside a field angle due to the hand shake of a photographer or the movement of the subject if the photographer attempts to frame the subject within the field angle. Accordingly, an image pickup apparatus including a subject tracking control function that automatically tracks the subject so as to frame the subject that is continuously moving within the field angle has been proposed.

Japanese Patent Laid-Open No. 2010-93362 discloses an image pickup apparatus that tracks the subject that is continuously moving toward the inside of the field angle (applies an optical tracking system) by driving an image shake correction mechanism for correcting an image shake. Additionally, an electronic tracking system has been known that serves as a tracking system of the subject that is different from the optical tracking system. When the electronic tracking system is applied, the image pickup apparatus tracks the subject and keeps it within the screen by dividing the inside of the screen for each block, detecting the subject from the screen by using a specific template matching such as the face of the subject, and trimming it around the detected area.

In the optical tracking system, a drive amount for performing track-driving of the subject is added, in addition to a drive amount of the shake correction mechanism for correcting the image shake (drive amount of the shake correction). Therefore, when the apparatus is designed such that the drive amount of the shake correction mechanism is made large by taking the driving amount for performing the track-driving of the subject into account, the size of the image pickup apparatus increases. Additionally, unless a drive limit of the shake correction mechanism is changed, the drive amount of the shake correction reduces by the drive amount for performing the track-driving. Additionally, when the drive amount of the shake correction mechanism becomes too large, the linear range of a sensor (for example, a Hall sensor) that detects the position of the shake correction mechanism is exceeded, the position is detected in the range of non-linear element, and thus, the performance of the shake correction mechanism decreases. Additionally, in the case of applying the electronic tracking system, if the subject moves outside the field angle, the image pickup apparatus cannot detect the subject, and the tracking of the subject is impossible.

SUMMARY OF THE INVENTION

The present invention provides an image processing apparatus that enables preventing the degradation of the performance of a shake correction mechanism, and enables easily tracking a subject if the subject moves to the outside the field angle.

An image processing apparatus of the present invention comprising a controller configured to select either of a first tracking system that tracks a subject by optical processing of an optical image shake correction unit, or a second tracking system that tracks the subject by electronic processing of cutting out an area of the subject from a captured image, as a tracking system used for tracking the subject in the captured image.

Further features of the present invention will become apparent from the following description of exemplary embodiments (with reference to the attached drawings).

BRIEF DESCRIPTION OF THE DRAWINGS

FIG. 2 is a flowchart illustrating an example of tracking control of a subject.

FIG. 3 is a flowchart illustrating the example of the tracking control of the subject.

DESCRIPTION OF THE EMBODIMENTS

Figure 1:
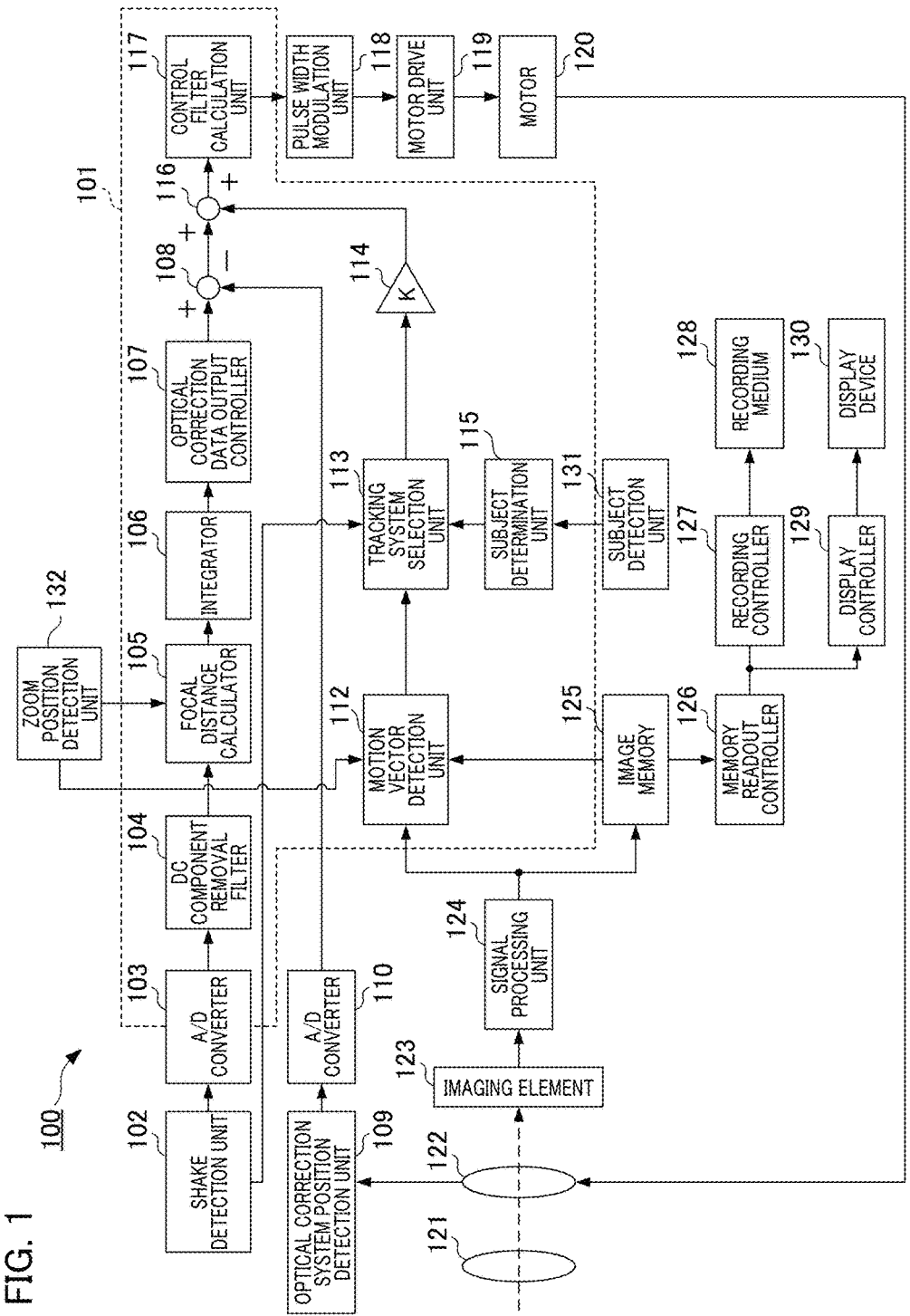
FIG. 1 is a diagram illustrating a configuration of an image pickup apparatus.

FIG. 1 is a diagram illustrating a configuration of an image pickup apparatus of the present embodiment.

An image pickup apparatus 100 is, for example, a digital single lens reflex camera, a digital compact camera, or a digital video camera. Note that the present invention is applicable to, for example, a camera-equipped mobile terminal, a surveillance camera, and a Web camera. The image pickup apparatus 100 has a shake correction mechanism that corrects a shake (image shake) of an image that is caused by a shake applied to the apparatus. In the embodiment, a CPU 101 drives an optical correction system 122, and a function for the shake correction mechanism is realized. In regards to the correction of the image shake, a description will be given of the correction of the image shake in either the vertical direction or the horizontal direction of the image. In regards to the correction of the image shake in other directions, its explanation will be omitted because it is similarly controlled.

A shake detection unit 102 detects an amount of the shake applied to the image pickup apparatus 100 due to the shaking of a hand shake, the shaking of the body, or the like, as an angular velocity signal, and supplies the angular velocity signal to an A/D converter 103. The shake detection unit 102 is, for example, an angular velocity sensor of a vibrating gyroscope. The A/D converter 103 digitizes an output signal of the angular velocity sensor (vibration detection unit) 102, and supplies it to a DC component removal filter 104 inside the CPU 101 as angular velocity data.

The DC component removal filter 104 blocks a low frequency component included in the angular velocity data from the A/D converter 103, and outputs a high-frequency component. The DC component removal filter 104 is, for example, a high-pass filter having a function capable of changing characteristics in any frequency band. Note that the DC component removal filter 104 may have a configuration in which a signal passed through a low-pass filter that blocks signals of the high frequency component of the output of the A/D converter 103 is subtracted from the output of the A/D converter 103, instead of the high-pass filter.

A zoom position detection unit 132 detects a zoom position (variable power position) of a zoom lens included in an imaging optical system 121, and outputs it to a focal distance calculation unit 105 inside the CPU 101. The zoom position detection unit 132 is, for example, a zoom encoder. The focal distance calculation unit 105 calculates a focal distance of the imaging optical system 121 based on the output of the zoom position detection unit 132, and corrects the output of the DC component removal filter 104 so as to be an optimal value to drive the optical correction system 122.

An integrator 106 has a function capable of changing its characteristics in any frequency band. The integrator 106 integrates the output from the focal distance calculation unit 105, and calculates a driving amount of the optical correction system 122. An optical correction data output controller 107 limits the output of the integrator 106 such that the optical correction system 122 is driven within a movable range determined by the zoom position detection unit 132.

An A/D converter 110 performs A/D conversion of the output of an optical correction system position detection unit 109 that detects the position of the optical correction system 122, and outputs the positional data of the optical correction system 122. A subtracter 108 subtracts this one data from the output of the optical correction data output controller 107, and supplies deviation data that is its result to an adder 116.

When the tracking of the subject by the optical correction system 122 is selected by a tracking system selection unit 113, the adder 116 adds an optical tracking correction amount that multiplies an optical hand shake correction amount that is an output of the subtracter 108 by the optical tracking drive gain K114, and supplies it to a control filter calculation unit 117. The control filter calculation unit 117 is configured by an amplifier that amplifies correction amount data that is output from the adder 116 at a predetermined gain, and a phase compensation filter. Signal processing by the amplifier and the phase compensation filter are performed on the correction amount data by the control filter calculation unit 117, and the correction data is output to a pulse width modulation unit 118.

The pulse width modulation unit 118 modulates the data supplied through the control filter calculation unit 117 to a PWM waveform that changes the duty ratio of the pulse wave, and supplies it to a motor drive unit 119. A motor 120 is, for example, a voice coil motor for driving the optical correction system 122, it is driven by the motor drive unit 119, and the optical correction system 122 moves in a direction perpendicular to the optical axis. The optical correction system position detection unit 109 includes a magnet, and, for example, a Hall sensor that is provided at a position facing the magnet, it detects a moving amount in a direction perpendicular to the optical axis of the optical correction system 122, and supplies the detected value to the subtracter 108 via the A/D converter 110. Accordingly, a feedback control system that tracks the moving amount in the direction perpendicular to the optical axis of the optical correction system 122, with respect to the output of the optical correction data output controller 107 is configured.

The imaging optical system. 121 performs operations including zoom and focus, and forms a subject image on an imaging element 123. The optical correction system 122 is a correction system that enables optically correcting shake, and that deflects the optical axis by moving in the direction perpendicular to the optical axis. The optical correction system 122 is, for example, a correction lens (shift lens). By the drive of the shift lens, an image in which the image shake caused by the shake applied to the apparatus (the movement of the subject on the imaging plane) is corrected is formed on the imaging element 123. The imaging element 123 converts the subject image that is formed via an optical system including an optical correction system 122 and the imaging optical system 121 into an image signal, and outputs it. That is, the imaging element 123 functions as an imaging unit that images a subject light guided by the imaging optical system 121, and outputs the captured image. A signal processing unit 124 generates a video signal conforming to, for example, an NTSC format, based on the output of the imaging element 123, and supplies it to a motion vector detection unit 112 and an image memory 125.

The motion vector detection unit 112 detects the motion vector of the image, based on a luminance signal included in the current video signal generated by the signal processing unit 124, and a luminance signal included in the video signal of one preceding field stored in the image memory 125. As a method of detecting the motion vector of the image, for example, a block matching method is applied. In the block matching method, the input image signal is divided into a plurality of block areas having a suitable size. Subsequently, a difference with a pixel in a fixed range of the previous field (or frame) in a block unit is calculated, and a block in the previous field (or frame) in which the sum of the absolute value of this difference becomes smallest is searched. The relative displacement between the screens indicates the motion vector of the block.

A subject detection unit 131 detects a subject to be tracked from the captured image. A subject determination unit 115 determines subject information related to the detected subject, and outputs the determination result to the tracking system selection unit 113. Depending on the feasibility of a predetermined condition, the tracking system selection unit 113 selects either the optical tracking system or an electronic tracking system as the tracking system used for the tracking of the subject in the captured image. The CPU 101 executes the control that tracks the subject by the selected tracking system.

The optical tracking system is a tracking system that tracks the subject by the drive of the optical correction system 122 (first tracking system). The electronic tracking system is a tracking system that tracks the subject by cutting out an area of the subject from the captured image (second tracking system).

A memory readout controller 126 reads out the image from the image memory 125, and supplies it to a recording controller 127 and a display controller 129. The recording controller 127 makes a recording medium 128 record the video signal. The recording medium 128 is a magnetic recording medium, for example, a hard disk, or an information recording medium, for example, a semiconductor memory. The display controller 129 drives a display device 130, and the display device 130 displays the image by a liquid crystal display device (for example, LCD).

FIG. 2 and FIG. 3 are flowcharts illustrating an example of tracking control of the subject by the image pickup apparatus. As shown in FIG. 2, first, the subject detection unit 131 determines whether or not the subject could be detected (step S201). When the subject could not be detected, the process returns to step S201. When the subject could be detected, the process proceeds to step S202.

In step S202, the subject determination unit 115 performs the determination of the subject information detected by the subject detection unit 131. The subject determination unit 115 determines whether or not, for example, the detected subject is a person, and the determination result is output to the tracking system selection unit 113 as the subject information.

Next, the tracking system selection unit 113 selects and sets either the optical tracking system or the electronic tracking system (step S203). The tracking system selection unit 113 selects the tracking system, based on at least the subject information from the subject determination unit 115, the motion vector from the motion vector detection unit 112, the shake amount from the shake detection unit 102, and the zoom position from the zoom position detection unit 132.

In the embodiment, the tracking of the subject is performed by basically using the electronic tracking system, and when the subject is outside the predetermined captured field angle for a predetermined period of time, the tracking of the subject is performed by using the optical tracking system. Subsequently, when the subject is again kept within the predetermined captured field angle while performing the tracking of the subject in the optical tracking system, the tracking of the subject in the optical tracking system stops, and the tracking of the subject in the electronic tracking system restarts.

However, when the zoom position is at the telephoto side and the subject has a motion vector amount at a high frequency that is large even if the subject is positioned within the captured field angle, the system is switched to the optical tracking system that is advantageous to the high frequency and the tracking of the subject is performed.

Figure 4A:
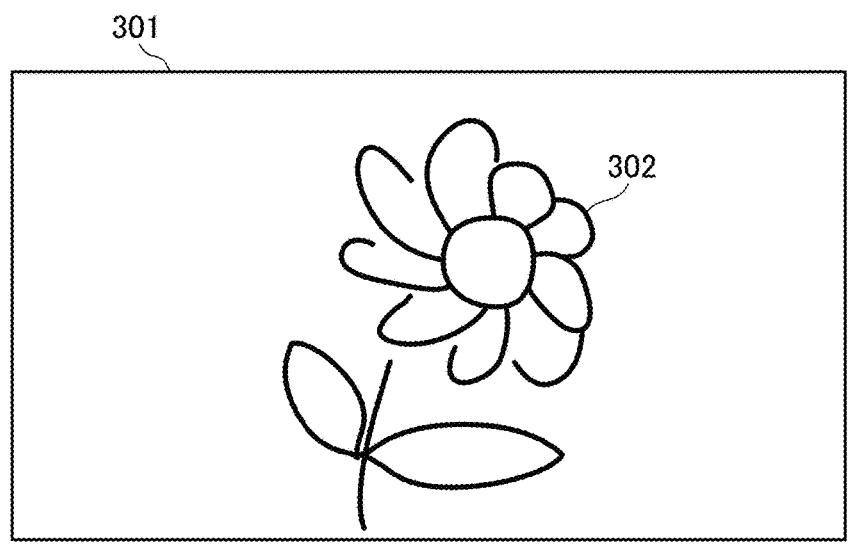
FIG. 4A is a diagram illustrating an example of a captured scene that performs tracking of the subject.

FIG. 4 is a diagram illustrating an example of the captured scene in which the tracking of the subject is performed by using the electronic tracking system. In FIG. 4A, a captured scene in which the zoom position is at the wide side and the subject has a small motion vector such as a flower is captured is illustrated. Reference numeral 301 indicates the captured field angle on the screen of the captured current field, and reference numeral 302 indicates the subject in the field angle.

Figure 4B:
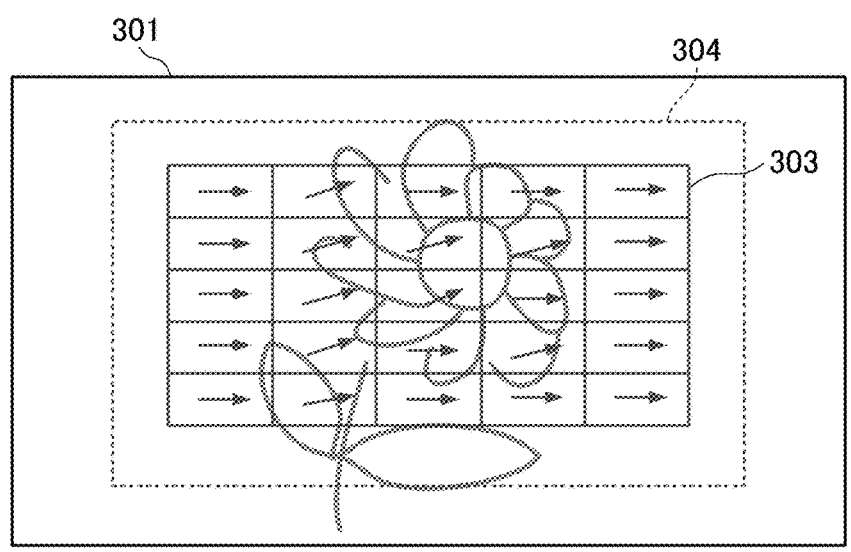
FIG. 4B is a diagram illustrating an example of a motion vector of the subject.

FIG. 4B illustrates the motion vector obtained by the difference with the previous field. Reference numeral 303 indicates the motion vector obtained for each small block that was divided into n×m from the detection range of the subject 302. Reference numeral 304 is a threshold for determining whether or not the subject is kept within a predetermined field angle. In such captured scene in which the zoom position is at the wide side and the motion vector of the subject is small, the subject 302 will be outside the captured field angle 301 with difficulty. Accordingly, the tracking system selection unit 113 selects the electronic tracking system. That is, the CPU 101 selects the electronic tracking system as the tracking system that is used at the start of the tracking of the subject when the subject is positioned within the captured field angle, the zoom position is at the wide side, and the motion vector is less than a predetermined amount.

Figure 5A:
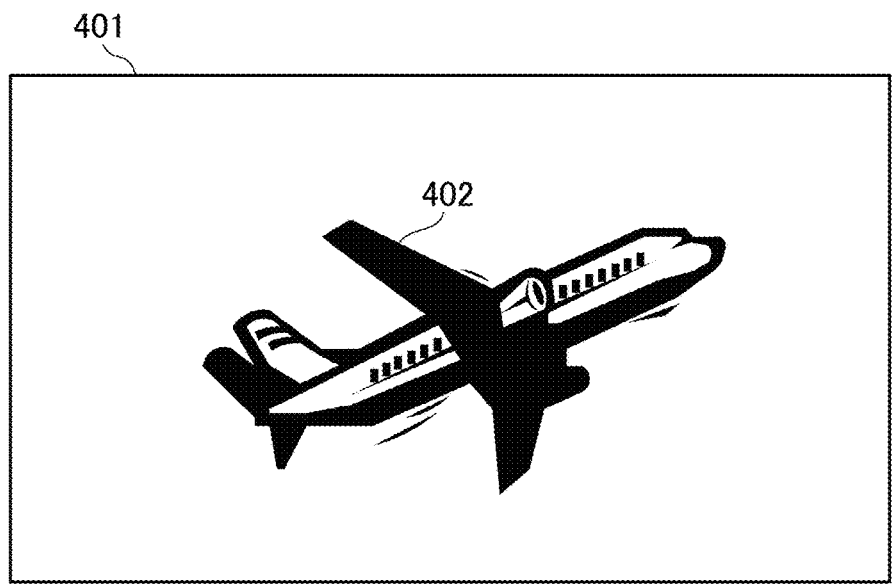
FIG. 5A is a diagram illustrating the example of the captured scene that performs tracking of the subject.

FIG. 5 is a diagram illustrating an example of the captured scene that performs the tracking of the subject by using the optical tracking system. In FIG. 5A, a captured scene in which the zoom position is at the telephoto side and the subject has a large motion vector such as an airplane is captured is illustrated. Reference numeral 401 indicates the captured field angle on the screen of the captured current field, and reference numeral 402 indicates the subject in the field angle.

Figure 5B:
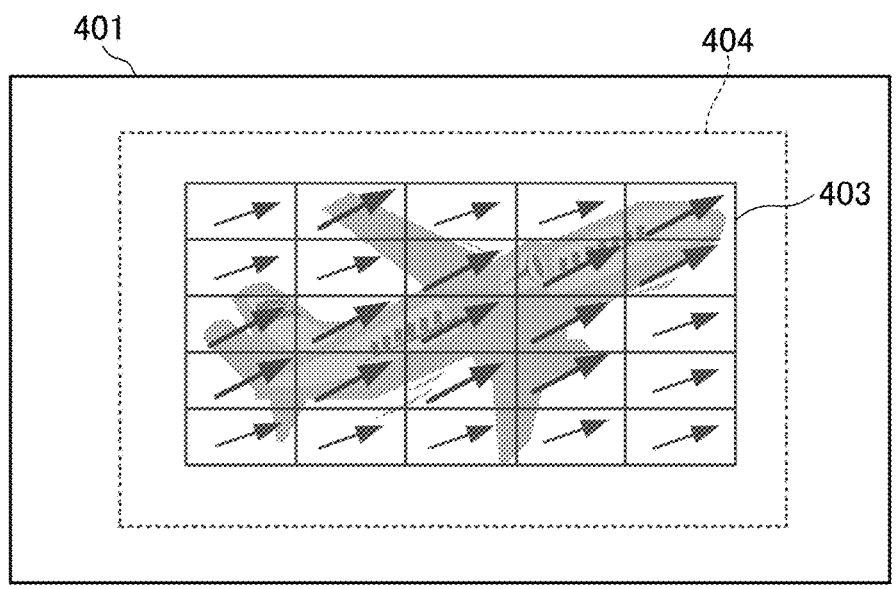
FIG. 5B is a diagram illustrating the example of the motion vector of the subject.

FIG. 5B illustrates the motion vector obtained by the difference with the previous field. Reference numeral 403 indicates the motion vector obtained for each small block that was divided into n×m from the detection range of the subject 402. Reference numeral 404 is a threshold for determining whether or not the subject has kept within the predetermined field angle. In a captured scene in which the zoom position is at the telephoto side and the motion vector of the subject is large, the subject 402 easily moves outside the captured field angle 401. Accordingly, the tracking system selection unit 113 selects the optical tracking system. That is, the CPU 101 selects the optical tracking system as the tracking system using at the start of the tracking of the subject when the zoom position is at the telephoto side, and the motion vector is larger than a predetermined amount even if the subject is within the captured field angle.

The description will be made referring back to FIG. 2. In step S204, the tracking system selection unit 113 determines that the tracking system set in step S203 is either the electronic tracking system or the optical tracking system. When the electronic tracking system is set, the process proceeds to step S205. When the optical tracking system is set, the process proceeds to step S209 in FIG. 3.

In step S205, the tracking system selection unit 113 calculates a trimming amount such that the subject is within the vicinity of the center of the captured field angle, based on the output from the motion vector detection unit 112. Subsequently, the CPU 101 starts the tracking of the subject by using the calculated trimming amount, that is, the CPU 101 starts the tracking of the subject by using the electronic tracking system (step S206).

In step S207, the tracking system selection unit 113 determines whether or not the subject has kept within the predetermined captured field angle. When the subject has kept within the predetermined field angle, applying the electronic tracking system is sequentially continued. Therefore, the process returns to step S205. When the subject has not kept within the predetermined field angle, the subject cannot be detected. Therefore, in this case, the process proceeds to step S208. In step S208, the tracking system selection unit 113 stops the tracking of the subject in the electronic tracking system, and it switches to the optical tracking system. Subsequently, the process proceeds to step S209 in FIG. 3.

In step S209 in FIG. 3, the tracking system selection unit 113 calculates the tracking drive amount in the optical tracking system. The tracking system selection unit 113 calculates the tracking drive amount based on the shake amount that is the output of the shake detection unit 102, the motion vector amount of the subject from the motion vector detection unit 112, the zoom position of the imaging optical system from the zoom position detection unit 132, and the subject information from the subject determination unit 115. The tracking drive amount is determined by the weighting of the optical tracking drive gain K114.

Figure 7A:
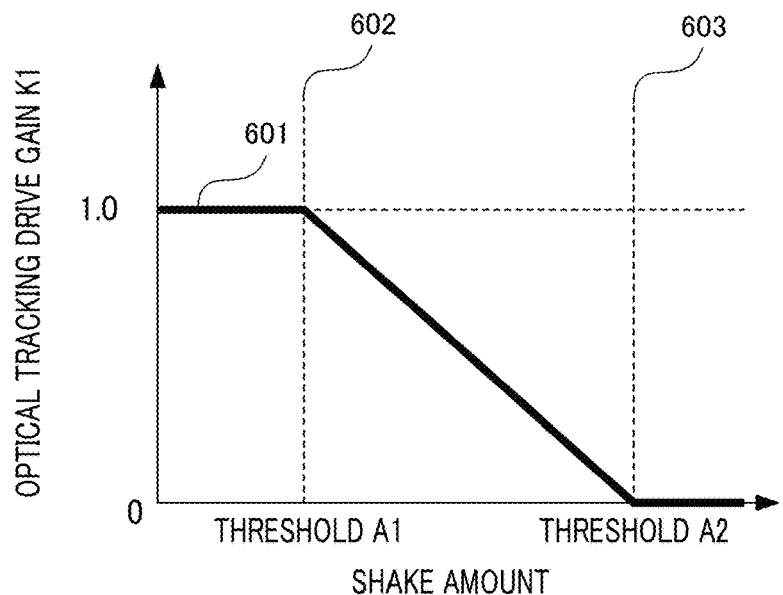
FIG. 7A and FIG. 7B are diagrams explaining weighting of an optical tracking drive gain K.

FIG. 7 is a diagram that explains the weighting of the optical tracking drive gain K. FIG. 7A illustrates the weighting of the optical tracking drive gain K114, according to the shake amount that is the output of the shake detection unit 102. Reference numeral 602 indicates the threshold A1, and reference numeral 603 indicates the threshold A2.

When the shake amount is less than the threshold value A1, the shake amount applied to the image pickup apparatus 100 is sufficiently small, and the correction drive amount for the image shake correction by the drive of the optical correction system is small. Accordingly, in this case, the CPU 101 performs the track-driving at 1 times the gain 601 without limiting the drive by the optical tracking system. When the shake amount is the threshold value A1 or more and less than the threshold value A2, the correction drive amount increases depending on the shake amount. Therefore, in this case, the CPU 101 gradually decreases the optical tracking drive gain K114 from 1 time with the increase of the shake amount.

When the shake amount is the threshold value A2 or more, the shake amount applied to the image pickup apparatus 100 is large, and the correction drive amount increases. Therefore, in this case, the CPU 101 sets 0 times or nearly 0 times of the gain.

Figure 7B:
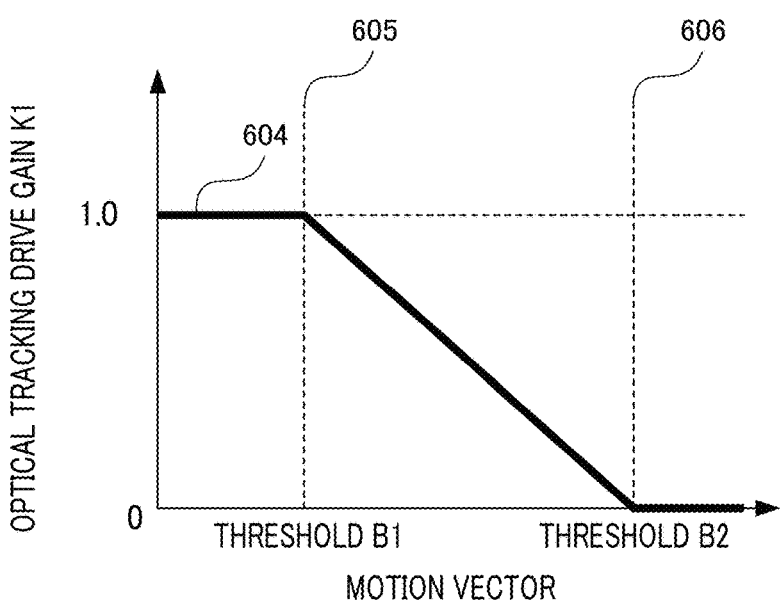

FIG. 7B illustrates the weighting of the optical tracking drive gain K114 according to the motion vector amount of the subject that is the output of the motion vector detection unit 112. The weighting is same as the weighting described with reference to FIG. 7A. That is, the CPU 101 performs the track-driving at 1 times the gain 604 when the motion vector amount is less than the threshold value B1 (less than the threshold 605). When the motion vector amount is the threshold value B1 or more and less than the threshold value B2 (less than the threshold 606), the CPU 101 gradually decreases the optical tracking drive gain K114 from 1 times with the increase of the motion vector amount. The CPU 101 sets 0 times or nearly 0 times of the gain when the motion vector amount is the threshold B2 or more.

Note that, in the embodiment, for the weighting of the optical tracking drive gain K114, although two points of the threshold are set for each threshold of the shake amount and threshold of the motion vector amount, three or more points of the threshold may be set, or one point of the threshold may be set. Additionally, it may be possible that the CPU 101 performs the weighting of the optical tracking drive gain K114 that becomes the output, based on the shake amount and the motion vector amount.

The description return to of FIG. 3. In step S210, the CPU 101 adds the shake correction drive amount that is the output of the optical correction data output controller 107 and the tracking driving amount calculated in step S209, and calculates a combined drive amount of the optical correction system. Subsequently, the CPU 101 drives the optical correction system based on the combined drive amount calculated in step S210.

Next, the CPU 101 determines whether or not the drive amount of the optical correction system is within the drive limit (step S212). When the drive amount of the optical correction system is within the drive limit, the process proceeds to step S213. When the drive amount of the optical correction system exceeds the drive limit, the tracking system selection unit 113 stops the tracking of the subject by the optical tracking system. Subsequently, the process proceeds to step S215.

Figure 6:
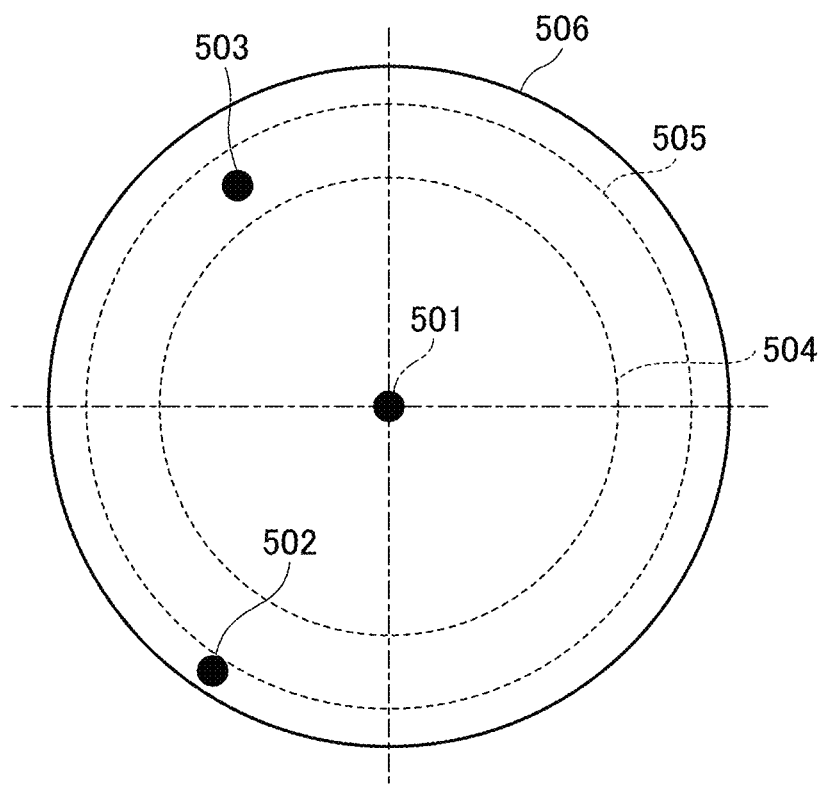
FIG. 6 is a diagram explaining a drive amount of an optical correction system.

FIG. 6 is a diagram that explains the drive amount of the optical correction system. Reference numeral 501 indicates that the optical correction system does not perform a shake compensation operation and it is positioned at the optical center position. Reference numeral 503 indicates that the drive amount of the optical correction system exceeds a first drive limit 504 and less than a second drive limit 505. Reference numeral 502 indicates that the drive amount of the optical correction system exceeds the second drive limit 505 and less than a drive end 506. In the embodiment, although the drive limit is set at two points, it may be set at three or more points, or may be set at one point.

The first drive limit 504 is a drive upper limit value as the shake correction amount. The second drive limit 505 is the drive upper limit at the time when the tracking drive amount by the optical tracking system is added to the shake correction amount. When the drive amount exceeds the second drive limit 505, a mechanical vignetting may occur because of the decrease of the light amount around the screen. Additionally, at the drive end 506, oscillation may occur because of the reduction of the control characteristics of the shake correction mechanism. Therefore, in these cases, it is desirable to return the optical correction system in the vicinity of the optical center position 601.

The description will be given returning to of FIG. 3. In step S213, the tracking system selection unit 113 determines whether or not the subject has kept within the predetermined captured field angle by the tracking of the subject by using the optical tracking system. When the subject has kept within the predetermined field angle, the process proceeds to step S214. Subsequently, the tracking system selection unit 113 stops the tracking of the subject by using the optical tracking system, starts the tracking of the subject by using the electronic tracking system, and the process returns to step S205 in FIG. 2. When the subject has not kept within the predetermined field angle, the process returns to step S209.

In step S215, the tracking system selection unit 113 determines whether or not the subject has kept within the predetermined field angle at the timing when the drive amount has exceeded the drive limit. When the subject has kept within the predetermined field angle, the process proceeds to step S216. Subsequently, the tracking of the subject in the electronic tracking system restarts while stopping the tracking of the subject in the optical tracking system, and the process returns to step S205 in FIG. 2. When the subject has not kept within the predetermined field angle, the CPU 101 finishes the tracking of the subject.

According to the image pickup apparatus in the embodiment, the tracking of the subject is performed while switching the optical tracking system and the electronic tracking system, the performance degradation of the shake correction mechanism can be prevented, and easy tracking of the subject is made possible even when the subject moves outside the field angle.

(Other Embodiments)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167644, filed Aug. 20 2014, which is hereby incorporated by reference wherein in its entirety.

What is claimed is:

1. An image processing, apparatus comprising:
a controller configured to select either of a first tracking system that tracks a subject by moving an optical unit in a direction different from an optical axis, or a second tracking system that tracks the subject electronically such that the subject is within a vicinity of the center of a captured image, as a tracking system used for tracking the subject so that the subject is kept within a predetermined angle of the captured image,
wherein the controller selects the second tracking system as the tracking system used at a start of the tracking of the subject when the subject is positioned within a captured field angle, a zoom position is at a wide side, and a motion vector is less than a predetermined amount.

2. The image processing apparatus according to claim 1,
wherein the controller selects either of the first tracking system or the second tracking system, based on at least any one of information relating to the subject to be tracked detected from the captured image, a shake amount applied, to an apparatus, a zoom position of an imaging optical system, or a motion vector of the subject detected from the captured image.

3. The image processing apparatus according to claim 1,
wherein the controller selects the first tracking system as the tracking system used at the start of the tracking of the subject hen the zoom position is at a telephoto side, and the motion vector is larger than a predetermined amount even if the subject is positioned within the captured field angle.

4. An image processing apparatus comprising:
a controller configured to select either of a first tracking system that tracks a subject by moving an optical unit in a direction different from an optical axis, or a second tracking system that tracks the subject electronically such that the subject is within a vicinity of the center of a captured image, as a tracking system used for tracking the subject so that the subject is kept within a predetermined angle of the captured image,
wherein the controller switches the tracking system used for the tracking of the subject to the first tracking system from the second tracking system when the subject moves outside a predetermined captured field angle in a case where the subject is tracked by the second tracking system.

5. An image processing apparatus comprising:
a controller configured to select either of a first tracking system that tracks a subject by moving an optical unit in a direction different from an optical axis, or a second tracking system that tracks the subject electronically such that the subject is within a vicinity of the center of a captured image, as a tracking system used for tracking the subject so that the subject is kept within a predetermined angle of the captured image,
wherein the controller is configured to switch the tracking system used for the tracking of the subject to the second tracking system from the first tracking system when the subject has kept within a predetermined captured field angle in a case Where the subject is tracked by the first tracking system.

6. An image processing apparatus comprising
a controller configured to select either of a first tracking system that tracks a subject by moving an optical unit in a direction different from an optical axis, or a second tracking system that tracks the subject electronically such that the subject is within a vicinity of the center of a captured image, as a tracking system used for tracking the subject so that the subject is kept within a predetermined angle of the captured image,
wherein the controller determines whether or not the subject is positioned within a captured field angle when a drive amount of the optical unit exceeds a drive limit in a case where the subject is tracked by the first tracking system,
wherein the controller switches the tracking system used for the tracking of the subject to the second tracking system from the first tracking system, in a case where the subject is positioned within the captured field angle, and
wherein the controller stops the tracking of the subject when the subject is not positioned within the captured field angle.

7. The image processing apparatus according to claim 1,
wherein the controller changes a gain used for a tracking drive of the subject in the first tracking system depending on a motion vector or a shake amount.

8. A control method of an image processing apparatus, the method comprising:
controlling that selects either of a first tracking system that tracks a subject by moving an optical unit in a direction different from an optical axis, or a second tracking system that tracks the subject electronically such that the subject is within a vicinity of the center of a captured image, as a tracking system used for tracking of the subject so that the subject is kept within a predetermined angle of the captured image, and tracks the subject,
wherein the controlling selects the second tracking system as the tracking system used at a start of the tracking of the subject when the subject is positioned within a captured field angle, a zoom position is at a wide side, and a motion vector is less than a predetermined amount.

9. A control method of an image processing apparatus, the method comprising:
controlling that selects either of a first tracking system that tracks a subject by moving an optical unit in a direction different from an optical axis, or a second tracking system that tracks the subject electronically such that the subject is within a vicinity of the center of a captured image, as a tracking system used for tracking of the subject so that the subject is kept within a predetermined angle of the captured image, and tracks the subject,
wherein the controlling switches the tracking system used for the tracking of the subject to the first tracking system from the second tracking system when the subject moves outside a predetermined captured field angle in a case where the subject is tracked by the second tracking system.

10. A control method of an image processing apparatus, the method comprising:
controlling that selects either of a first tracking system that tracks a subject by moving an optical unit in a direction different from an optical axis, or a second tracking system that tracks the subject electronically such that the subject is within a vicinity of the center of a captured image, as a tracking system used for tracking of the subject so that the subject is kept within a predetermined angle of the captured image, and tracks the subject,
wherein the controlling switches the tracking system used for the tracking of the subject to the second tracking system from the first tracking system when the subject has kept within a predetermined captured field angle in a case where the subject is tracked by the first tracking system.

11. A control method of an image processing apparatus, the method comprising:
controlling that selects either of a first tracking system that tracks a subject by moving an optical unit in a direction different from an optical axis, or a second tracking system that tracks the subject electronically such that the subject is within a vicinity of the center of a captured image, as a tracking system used for tracking of the subject so that the subject is kept within a predetermined angle of the captured image, and tracks the subject, wherein the controlling determines whether or not the subject is positioned within a captured field angle when a drive amount of the optical unit exceeds a drive limit in a case where the subject is tracked by the first tracking system,
wherein the controlling switches the tracking system used for the tracking of the subject to the second tracking system from the first tracking system, in a case where the subject s positioned within the captured field angle, and
wherein the controlling stops the tracking of the subject when the subject is not positioned within the captured field angle.

* * * * *